US010901226B2

(12) United States Patent
Oleschuk et al.

(10) Patent No.: US 10,901,226 B2
(45) Date of Patent: Jan. 26, 2021

(54) AXICON LENSES

(71) Applicant: Queen's University at Kingston, Kingston (CA)

(72) Inventors: Richard Oleschuk, Kingston (CA); Hans-Peter Loock, Kingston (CA); Kyle Bachus, Wallaceburg (CA)

(73) Assignee: Queen's University at Kingston, Kingston (CA)

( * ) Notice: Subject to any disclaimer, the term of this patent is extended or adjusted under 35 U.S.C. 154(b) by 147 days.

(21) Appl. No.: 16/111,809

(22) Filed: Aug. 24, 2018

(65) Prior Publication Data
US 2019/0079303 A1    Mar. 14, 2019

Related U.S. Application Data

(60) Provisional application No. 62/550,248, filed on Aug. 25, 2017.

(51) Int. Cl.
*G02B 27/09*    (2006.01)
*G02B 3/00*    (2006.01)
*G02B 5/00*    (2006.01)

(52) U.S. Cl.
CPC ....... *G02B 27/0955* (2013.01); *G02B 3/0012* (2013.01); *G02B 5/001* (2013.01)

(58) Field of Classification Search
None
See application file for complete search history.

(56) References Cited

U.S. PATENT DOCUMENTS

2008/0019639 A1*    1/2008 Donlagic .............. G02B 6/262
385/35

OTHER PUBLICATIONS

Eisenstein, G. et al., "Chemically etched conical microlenses for coupling singe-mode lasers into single-mode fibers", Applied Optics, vol. 21, No. 19, pp. 3470-3474, (1982).
Eah, S-K., et al., "Nearly diffraction-limited focusing of a fiber axicon microlens", Review of Scientific Instruments, vol. 74, No. 11, pp. 4969-4971, (2003).
Hoffmann, P. et al., "Comparison of mechanically drawn and protection layer chemically etched optical fiber tips", Ultramicroscopy, vol. 61, pp. 165-170, (1995).
Ribeiro,R.S., et al., "New Trends on Optical Fiber Tweezers", Journal of Lightwave Technollogy, vol. 33, No. 16, pp. 3394-3405, (2015).

(Continued)

Primary Examiner — Robert E. Tallman
(74) Attorney, Agent, or Firm — Stephen J. Scribner

(57) ABSTRACT

A capillary comprises a capillary channel, an inner layer, and an outer layer, wherein the inner and outer layers comprise different silica materials. An axicon lens formed on a facet end of the capillary channel has a selected geometry, such that the inner layer has an axicon angle γ and a post angle α. The inner layer may be fused silica and the outer layer may be borosilicate glass. The post angle α is determined in part by an etch rate constant of the borosilicate glass and an etch rate constant of the fused silica in at least one etching reagent. Embodiments may comprise at least two capillary channels, and an axicon lens formed on a facet end of each of the at least two capillary channels. The capillary may be used as an electrospray emitter, optionally with light simultaneously while generating an electrospray.

11 Claims, 11 Drawing Sheets

(56) References Cited

OTHER PUBLICATIONS

Stockle, R. et al., "High-quality near-field optical probes by tube etching", Applied Physics Letters, vol. 75, No. 2, pp. 160-162, (1999).
Mohanty, S.K., et al., "Organization of microscale objects using a microfabricated optical fiber", Optics Letters, vol. 33, No. 18, pp. 2155-2157, (2008).
Kuchmizhak, A., et al., "High-quality fiber microaxicons fabricated by a modified chemical etching method for laser focusing and generation of Bessel-like beams", Applied Optics, vol. 53, No. 5, pp. 937-943, (2014).
Fu, T., et al., A Microstructured Fiber with Defined Borosilicate Regions to Produce a Radial Micronozzle Array for Nanoelectrospray Ionization, Scientific Reports 6:21279 | DOI: 10.1038/srep21279, (2016).

\* cited by examiner

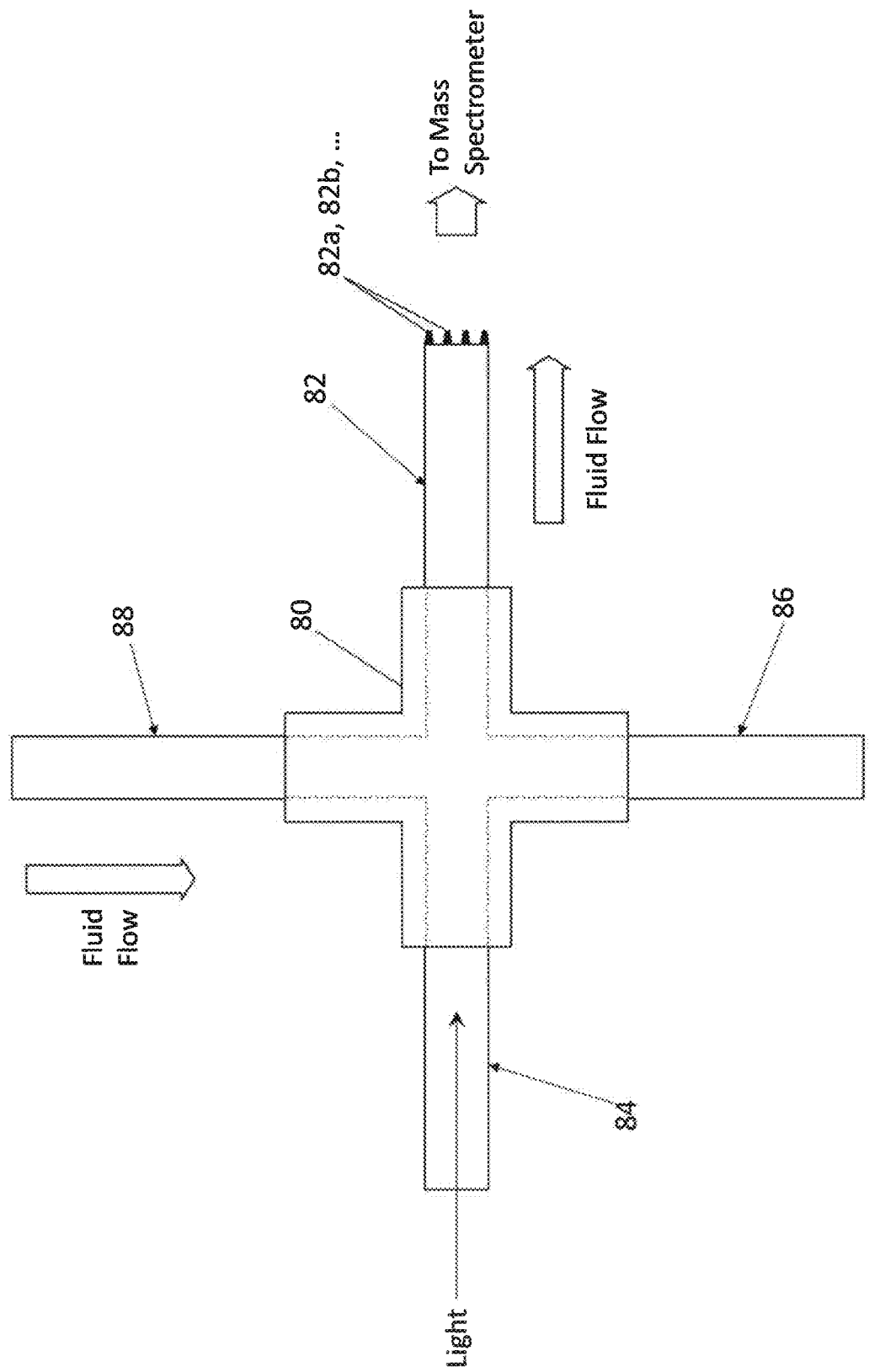

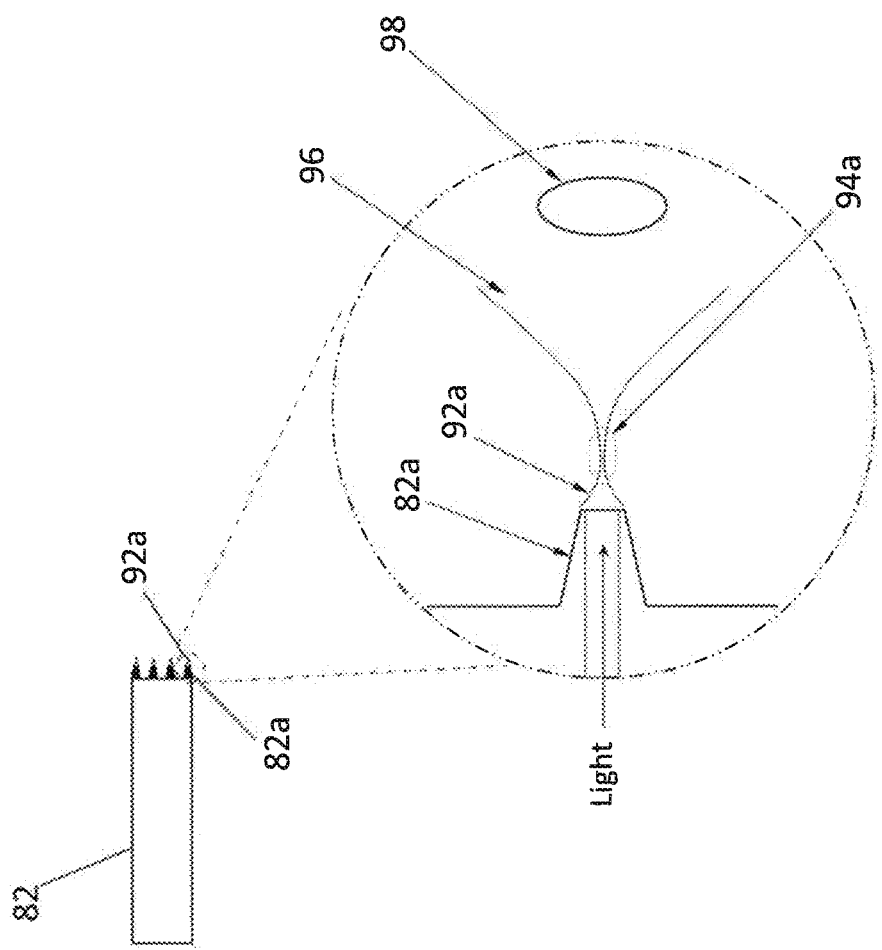

AXICON LENSES

RELATED APPLICATION

This application claims the benefit of the filing date of Application No. 62/550,248, filed on 25 Aug. 2017, the contents of which are incorporated herein by reference in their entirety.

FIELD

This invention relates to fabrication of axicon lenses on silica capillaries and microstructured fibres by anisotropic chemical etching, and to use of axicon lenses in applications such as electrospray emitters.

BACKGROUND

Bessel beams exhibit a tight focal spot in the transverse plane, and a focal volume that is elongated along the optical axis compared to that produced by a spherical lens. Due to their non-diffracting, "self-healing" nature, Bessel beams are employed in a wide variety of applications including non-linear optics, lithography, microfabrication, atom-trapping, and optical tweezers, among others. Bessel beams can be created using optical components such as an annular aperture located at the focal plane of a lens, spatial light modulation, computer generated holograms, or more simply through the use of axicon lenses. Axicon lenses generate Bessel beams from collimated beams of light using a cone-shaped lens. Axicon lenses have been used in a wide range of devices and applications. The fabrication of axicon lenses on the facet of multimode fibers (i.e., microaxicons or microaxicon lenses) has been carried out using fiber polishing, and focused ion beam technology, however, most fabrication strategies have focused on wet-chemical etching with hydrofluoric acid (Eisenstein et al., *Appl. Opt.* 21:3470-3474, 1982; Eah et al., *Rev. Sci. Instrum.* 74:4969-4971, 2003) using either the Turner or tube-etching methods.

The Turner method (Hoffmann et al., *Ultramicroscopy* 61:165-170, 1995) involves etching a fiber at the meniscus between an organic layer and hydrofluoric acid with its protective polymer coating removed. The process produces a tapered structure due to the decreasing height of the meniscus as the fiber diameter is reduced (Ribeiro et al., *J. Lightwave Technol.* 33:3394-3405, 2015). During tube-etching (Stockle, et al., *Appl. Phys. Lett.* 75:160-162, 1999), the fiber's acrylate coating is not removed and acts as a protective shell to maintain the integrity of the outer portion of the fiber. The etching process proceeds in the hollow cylinder formed by the coating as the glass is gradually removed by etching. After the etching is complete, the protective coating is removed chemically using hot concentrated sulfuric acid, or by mechanical stripping. Eisenstein et al. (1982) initially reported the use of wet-chemical etching to produce an axicon lens on the end of a single-mode optical fiber and showed that the height of conical lenses protruding from the core of a fiber could be controlled by adjusting the composition and temperature of the etchant solution. The resulting lensed fiber improved the coupling of single-mode injection lasers and single-mode fibers. Eah et al. (2003) utilized wet-chemical etching to produce a microaxicon on the facet of a commercially-available single-mode fiber. Mohanty et al., *Opt. Lett.* 33:2155-2157, 2008) used differential etching and a modified tube-etching method to fabricate an axicon with cone angles varying from 30° to 60° on the tip of an optical fiber. The microaxicon lenses were utilized to trap low-index microscopic objects. Kuchmizhak et al. (*Appl. Opt.* 53:937-943, 2014) reported the fabrication of high quality microaxicons on the end-face of optical fibers using the tube-etching method. The tube-etching method involved placing the fiber in a solution of concentrated hydrofluoric acid (40%) for up to seven hours. Ion-beam milling was then applied to remove a portion of the tapered end, and the fiber was immersed again in an aqueous solution of hydrofluoric acid (10%).

Although such prior methods can produce microaxicon lenses with favourable characteristics, the lengthy multi-step fabrication processes are a drawback and present an obstacle to production scale-up.

SUMMARY

According to one aspect of the invention there is provided a method for fabricating an axicon lens on a capillary, comprising: providing a capillary having a channel, an inner layer, and an outer layer, wherein the inner and outer layers comprise different silica materials; flowing liquid through the capillary channel from a first end to a second end at a selected flow rate; etching the second end of the capillary by submersing the second end substantially perpendicularly in a solution comprising at least one etching reagent at a selected concentration; wherein liquid flowing out of the second end of the capillary channel creates a concentration gradient of the at least one etching reagent; removing the capillary from the etching reagent solution after an etching time so that an axicon lens geometry is achieved; wherein the axicon lens geometry comprises the inner layer having: i) an axicon angle $\gamma$ determined by the concentration gradient, and ii) a post angle $\alpha$ determined by a ratio of etch rate constants of the different silica materials in the solution comprising at least one etching reagent.

In one embodiment, the inner layer comprises fused silica and the outer layer comprises borosilicate glass.

In one embodiment, the post angle $\alpha$ is determined by a ratio of an etch rate constant of the borosilicate glass and an etch rate constant of the fused silica in the solution comprising at least one etching reagent.

In one embodiment, the capillary comprises a microstructured fibre (MSF).

In one embodiment, the MSF comprises two or more channels; wherein each channel of the two or more channels comprises the inner layer and the outer layer; wherein the axicon lens geometry is achieved for each channel of the two or more channels.

According to another aspect of the invention there is provided a capillary, comprising: a capillary channel, an inner layer, and an outer layer, wherein the inner and outer layers comprise different silica materials; an axicon lens formed on a facet end of the capillary channel; wherein the axicon lens has a selected geometry comprising the inner layer having an axicon angle $\gamma$ and a post angle $\alpha$.

In one embodiment, the inner layer comprises fused silica and the outer layer comprises borosilicate glass.

In one embodiment, the post angle $\alpha$ is determined in part by an etch rate constant of the borosilicate glass and an etch rate constant of the fused silica in at least one etching reagent.

In one embodiment, the capillary is a MSF comprising at least two capillary channels, and an axicon lens formed on a facet end of each of the at least two capillary channels.

According to another aspect of the invention there is provided a electrospray emitter, comprising a capillary having at least one capillary channel and an axicon lens formed on a facet end of each of the at least one capillary channel, as described herein.

In one embodiment the electrospray emitter is configured for use with light, wherein the selected axicon lens geometry focuses the light substantially in a region of a Taylor cone produced by the electrospray emitter.

In one embodiment the electrospray emitter is for use with a mass spectrometer.

According to another aspect of the invention there is provided a method for generating an electrospray, comprising configuring an electrospray emitter as described herein for use with light simultaneously while generating the electrospray, wherein an axicon lens geometry is selected to focus the light substantially in a region of a Taylor cone produced by the electrospray emitter.

BRIEF DESCRIPTION OF THE DRAWINGS

For a greater understanding of the invention, and to show more clearly how it may be carried into effect, embodiments will be described, by way of example, with reference to the accompanying drawings, wherein:

FIGS. 3A-3C are schematic diagrams of rays incident on the surface of a microaxicon lens; wherein FIG. 3A shows two rays that contribute to an intensity increase at the optical axis, FIG. 3B shows two rays that contribute to a ring pattern observable at large cone angles, and FIG. 3C shows a light ray and an internal reflection at an inner microaxicon lens surface.

FIG. 8 is a schematic diagram showing a MSF with axicon lenses configured for use with light as a microspray emitter for mass spectrometry, according to one embodiment.

FIG. 9 is a schematic diagram showing a MSF with axicon lenses configured for use with light as a microspray emitter for mass spectrometry, according to one embodiment.

DETAILED DESCRIPTION OF EMBODIMENTS

One aspect of the invention relates to fabrication of microaxicon lenses on the end facets of silica capillaries. The capillaries may be used for optical trapping where the particle is introduced on-axis by delivery through the same capillary that provides focusing of the co-propagated light beam. Such devices also allow for optical excitation and possible evaporation of a sample at the end of the capillary waveguide. A model is provided to describe the formation of an etchant gradient. The consequent differential etch rates are used to control the axicon angle. The protocol was also used to fabricate microaxicon lenses at the ends of borosilicate-doped capillaries of a custom-designed multichannel microstructured optical fiber (also referred to herein as a microstructured fiber (MSF)). En one embodiment, etching gradients created by slowly flowing water into the etching solution permit the rapid and simultaneous fabrication of several fiber microaxicon lenses in less than 20 minutes.

Another aspect of the invention relates to a micro or nano electrospray emitter comprising one or more microaxicon lenses on the end facet of a silica capillary. The silica capillary may be a MSF, and may include doped silicate regions (e.g., borosilicate). Use of the electrospray emitter for an application such as mass spectrometry includes configuring the axicon lenses for use with light. Thus, the fabrication techniques described in detail herein allow axicon lenses to be produced that not only function as electrospray emitters that produce Taylor cones, but also allow axicon lens geometry to be tailored for selected optical characteristics, such as for focusing the light into the region of the Taylor cone, for a given wavelength of light.

As used herein, the terms "axicon lens" and "microaxicon lens" are equivalent.

Embodiments will be further described by way of the following non-limiting Example.

EXAMPLE

1. Experimental
Fiber Fabrication

Figures 1A, 1B:
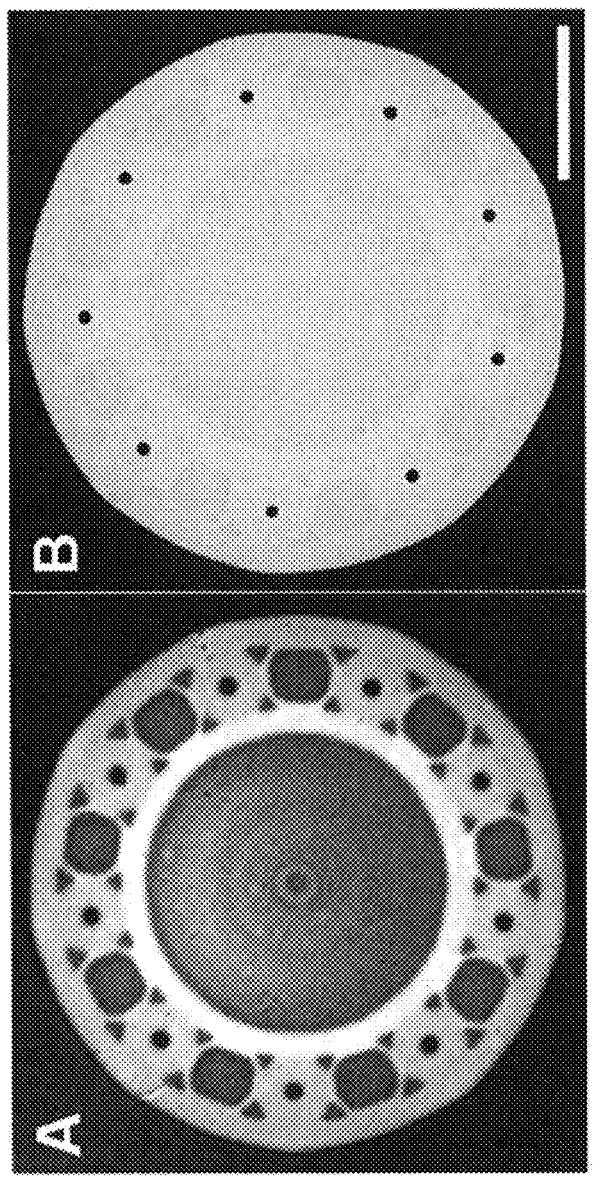
FIGS. 1A and 1B are optical and scanning electron micrographs, respectively, of a custom-designed microstructured fiber used in embodiments described herein.

A custom microstructured fiber (MSF) was fabricated as described by Fu et al., 2016 ("A microstructured fiber with defined borosilicate regions to produce a radial micronozzle array for nanoelectrospray ionization", Sci. Rep. 6, Art. 21279). Briefly, a set of borosilicate and silicate rods was stacked in a desired arrangement around a large borosilicate core and silica capillaries were inserted within the structure to produce a preform. The capillaries were arranged equidistantly in a radial pattern. The preform was then drawn into a fiber with desired dimensions (e.g., MSF Ø360 µm silica core Ø50 µm, and capillary bore Ø8 µm) by adjusting the drawing speed. An embodiment is shown in FIGS. 1A and 1B. FIG. 1A is an optical micrograph wherein the dark-shaded regions correspond to regions of borosilicate (9 mol %) glass and the light-shaded regions correspond to fused-silica. FIG. 1B is a scanning electron micrograph of the microstructured fiber are shown in FIG. 1A. The scale bar in FIG. 1B is 100 µm.

Microaxicon Lens Fabrication

Prior to etching a capillary (e.g., Polymicro Ø360 µm, bore Ø10 µm (Molex LLC, Lisle, Ill., USA)), the protective polyimide jacket was removed from the fiber using a wire stripper (Stripall TWC-1, Teledyne Impulse, San Diego, Calif., USA). Protective acrylate jackets, as may be provided with other capillaries, may be removed chemically using dichloromethane. Following removal of the jacket the bare capillary was cleaved using a precision fiber cleaver (LDC-400, Vytran, Morganville, N.J., USA). Cleave quality was assessed by optical microscopy, and when the cleave was found to be uniformly smooth and without cracks or chips, the capillary was connected to a syringe filled with degassed, deionized water and placed on a syringe pump (Harvard Apparatus Pump 11 Plus, Holliston, Mass., USA). The syringe pump was used to control the flow rate of deionized water passing through the channels of the capillaries. When the capillaries are in a microstructured fiber bundle, the flow through all channels must be similar and consistent in order to ensure that all microlenses are substantially identical. The flow speed and was monitored using a USB microscope (Veho VMS-004D) prior to submersing the capillaries in the etchant. After allowing sufficient time (e.g., 1-5 minutes) for flow equilibration through the channels, the end of the capillary/fiber was submersed in a solution of concentrated hydrofluoric acid (HF) (48 wt %) such that the capillary did not contact the edges of the container and was perpendicular to the surface of the HF solution. The capillary was etched at 22±1° C. with a constant flow (~50 nL/min for a capillary and ~80 nL/min for MSF) for different durations (typically on the order of minutes), depending on the desired etch profile (e.g., axicon angle).

Optical Characterization of Microlenses

Figure 2:
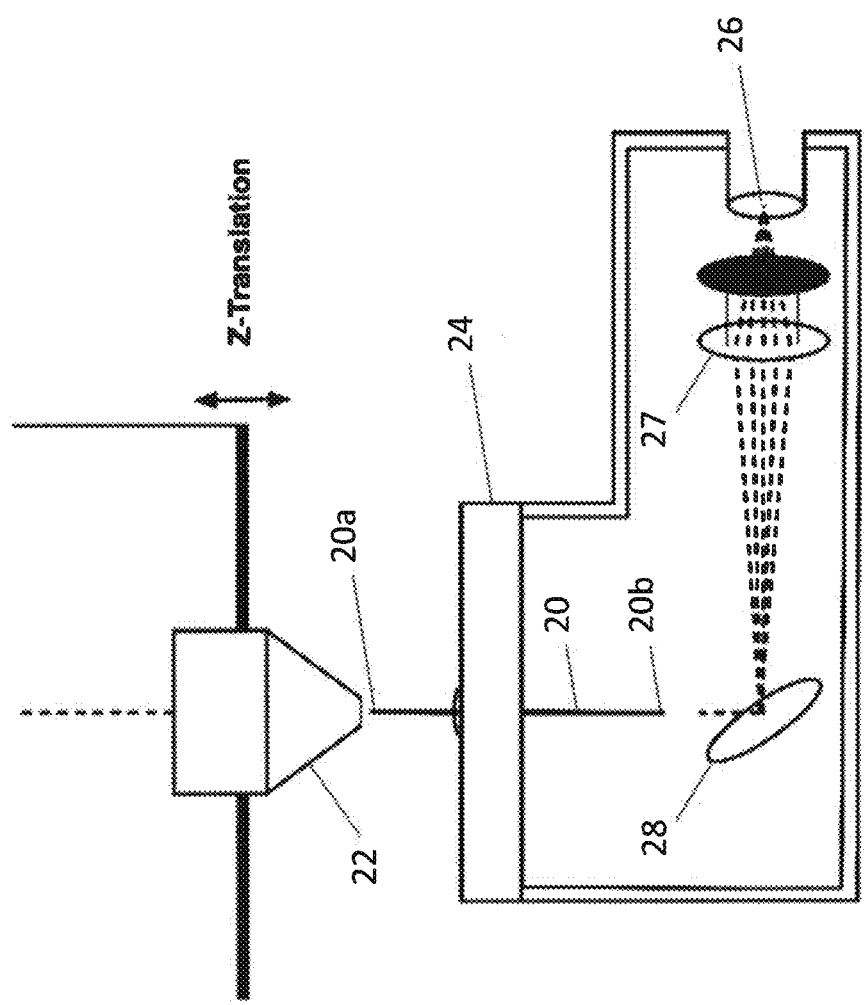
FIG. 2 is a schematic diagram of an experimental set-up for imaging emission patterns of microaxicon lenses according to embodiments described herein.

The focusing pattern created by the axicon lenses was inspected using an optical microscope whose optical axis was co-aligned with the capillary axis. A schematic drawing of the experimental setup for image acquisition is shown in FIG. 2. The axicon lenses were examined by increasing the distance between the microscope's objective lens 22 and the axicon lenses in well-controlled increments. The axicon lens end 20a of the capillary 20 was mounted on the translation stage 24 of the microscope, and light from a 532 nm laser diode 26 was coupled into the free end 20b of the capillary using optical components such as a lens 27 and mirror 28. Images were taken at regular distance intervals (5 µm) and compiled into cross sections using ImageJ software (US National Institutes of Health).

The microaxicon lenses formed on the silica portions of the MSF were similarly characterized (at Universite Laval, Quebec, Canada) using a CMOS camera that was mounted on a single-axis translation stage in order to facilitate movement through the focal range of the microaxicon lenses without moving the fiber and compromising the light coupling. The camera was moved from the face of the fiber in 10 µm increments and images were taken at each interval. These fibers were also characterized using an optical microscope and a 980 nm source (otherwise analogous to the capillary microaxicon lenses) wherein the z movement of the objective was digitally measured with 0.5 µm resolution.

Scanning Electron Microscopy

Scanning electron micrographs (SEM) were taken (FEI Quanta 650 FEG ESEM) to characterize the microaxicon lens shape and the overall fiber profile. SEM and optical imaging was performed before and after microaxicon lens optical measurements to ensure no structural changes had occurred during the measurement process. SEM analysis was also performed to measure the angle of the microaxicon lenses. All SEM images where obtained under low vacuum conditions without the presence of a conductive coating.

2. Ray Optics Model

A cone-shaped tip at the end of a multimode optical waveguide is expected to retain some of the inherent properties of a conventional axicon lens. The main difference is due to the multimode nature of the capillary or fiber. Instead of a plane wave or collimated beam interacting with the conical surface, the light rays in a multimode waveguide are exiting the fiber at a range of angles given by the numerical aperture of the fiber. Modelling of the emission pattern therefore requires sampling light rays at all possible refraction angles. The intensity distribution in the medium outside the cone-terminated waveguide as well as inside the axicon lens itself is of particular relevance to the invention.

A variety of methods are suited to modelling this intensity distribution. Considering that all dimensions are large compared to the wavelength of the light we used a ray tracing approach. Also, instead of performing a Monte-Carlo type approach to determine the irradiated volume elements for each ray of light, we inverted the problem and determine for each volume element in the sample space the number of surface elements on the axicon lens that contribute rays to its irradiation. The approach is fast and exact. Since the system has cylindrical symmetry, it is sufficient to solve the two-dimensional problem. The three-dimensional intensity distribution can be readily obtained from an Abel transformation (K. Bescherer, et al., *Appl. Opt.* 52, B40-B45 (2013); D. Munzke, et al., *Appl. Opt.* 51, 9 (2012)).

In the calculations the following assumptions were used:
1. The wave nature of light was neglected; effects due to coherence were ignored.
2. only a single refraction or reflection was included in the calculations; this had the consequence that rays that were internally reflected inside the axicon lens were not followed once they were emitted by the lens.
3. Reflections at sub-critical angles (Fresnel reflections) were ignored. This also had the consequence that refracted light always carried the initial intensity.
4. The multimode fiber was assumed to be perfectly filled, i.e., all internal reflection angles in the range permitted by the numerical aperture were assumed to be equally likely.
5. Absorption and scattering was ignored.
6. The center hole of the capillary was ignored.

Figure 3A:
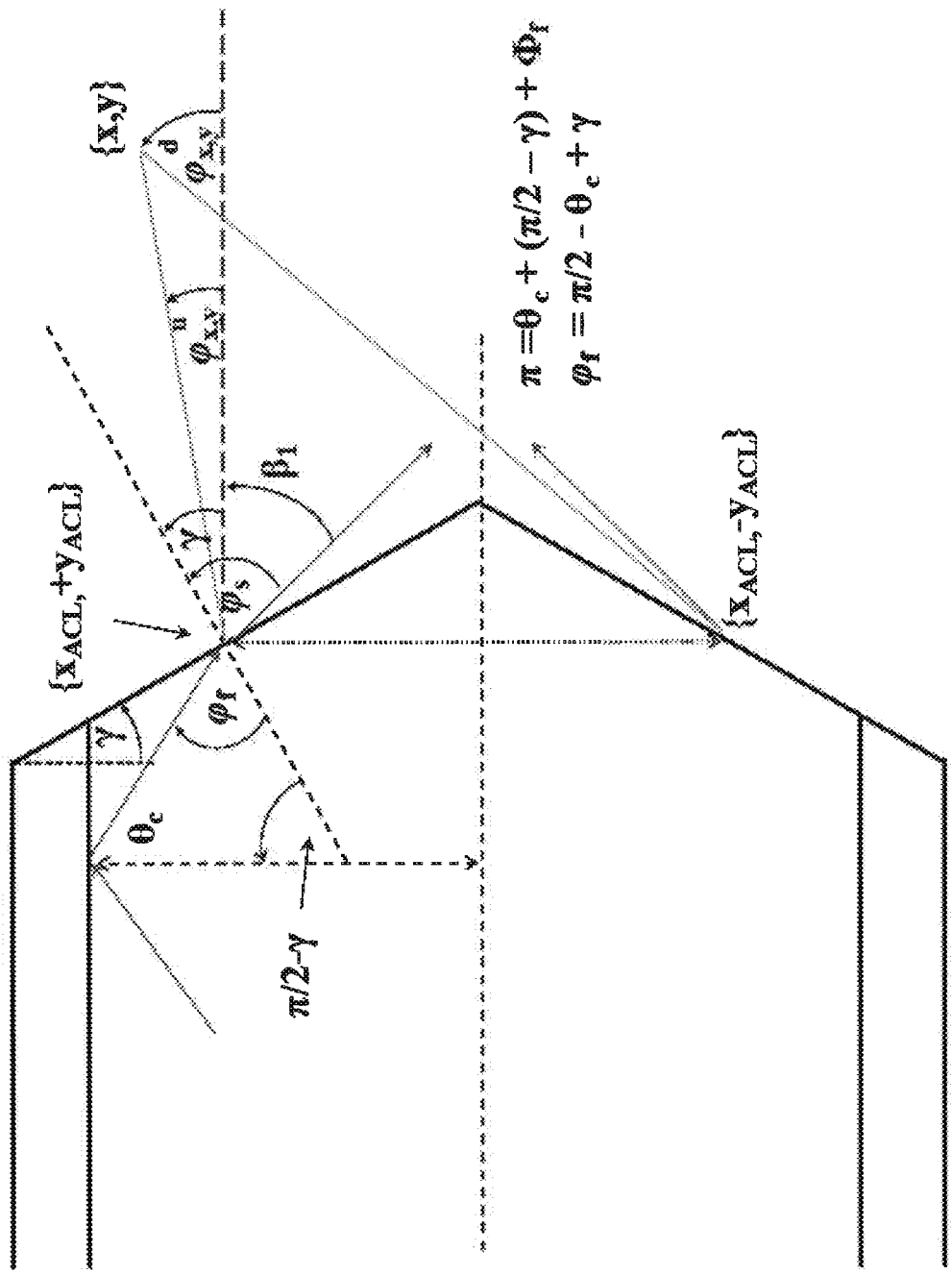
Figure 3B:
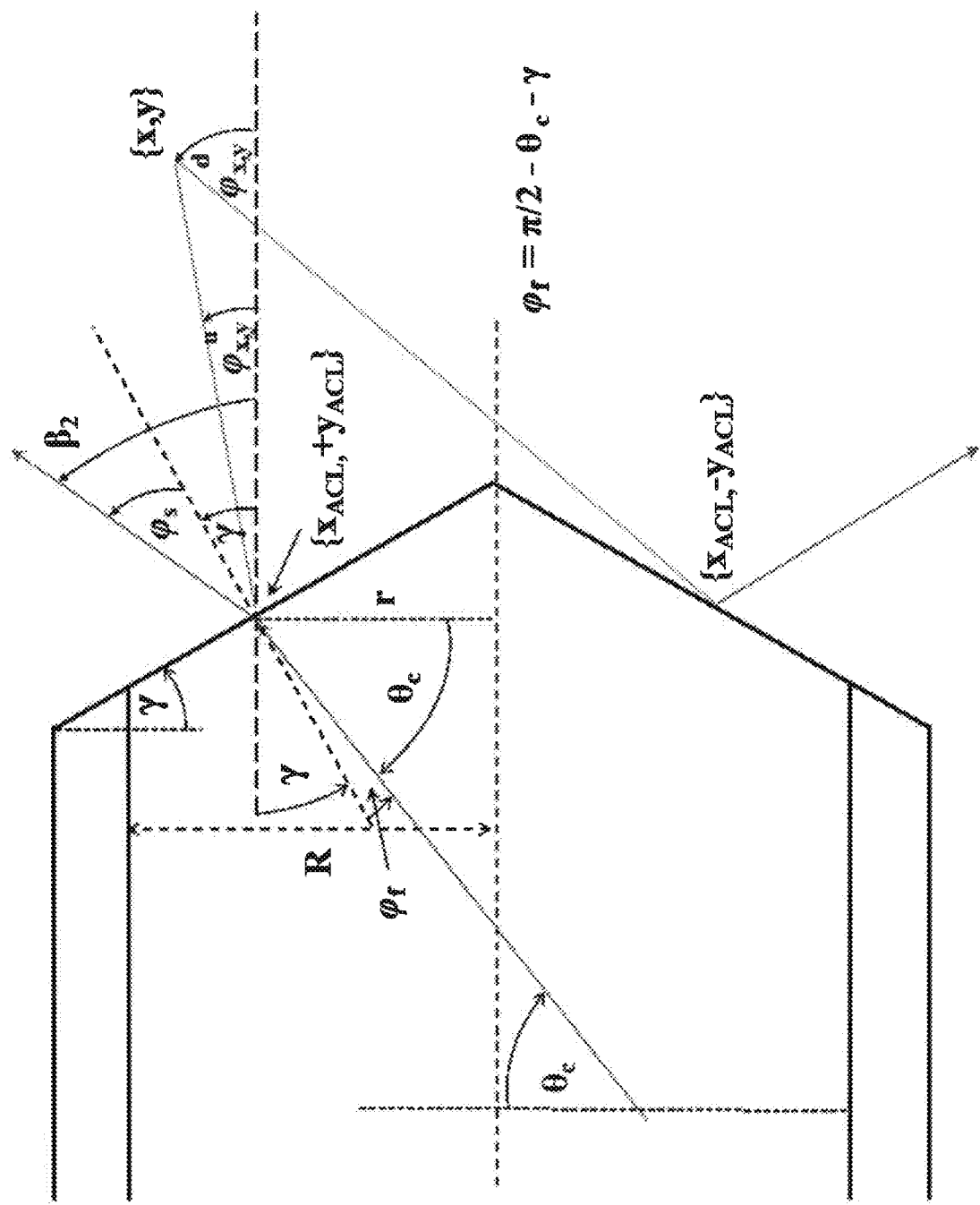
Figure 3C:
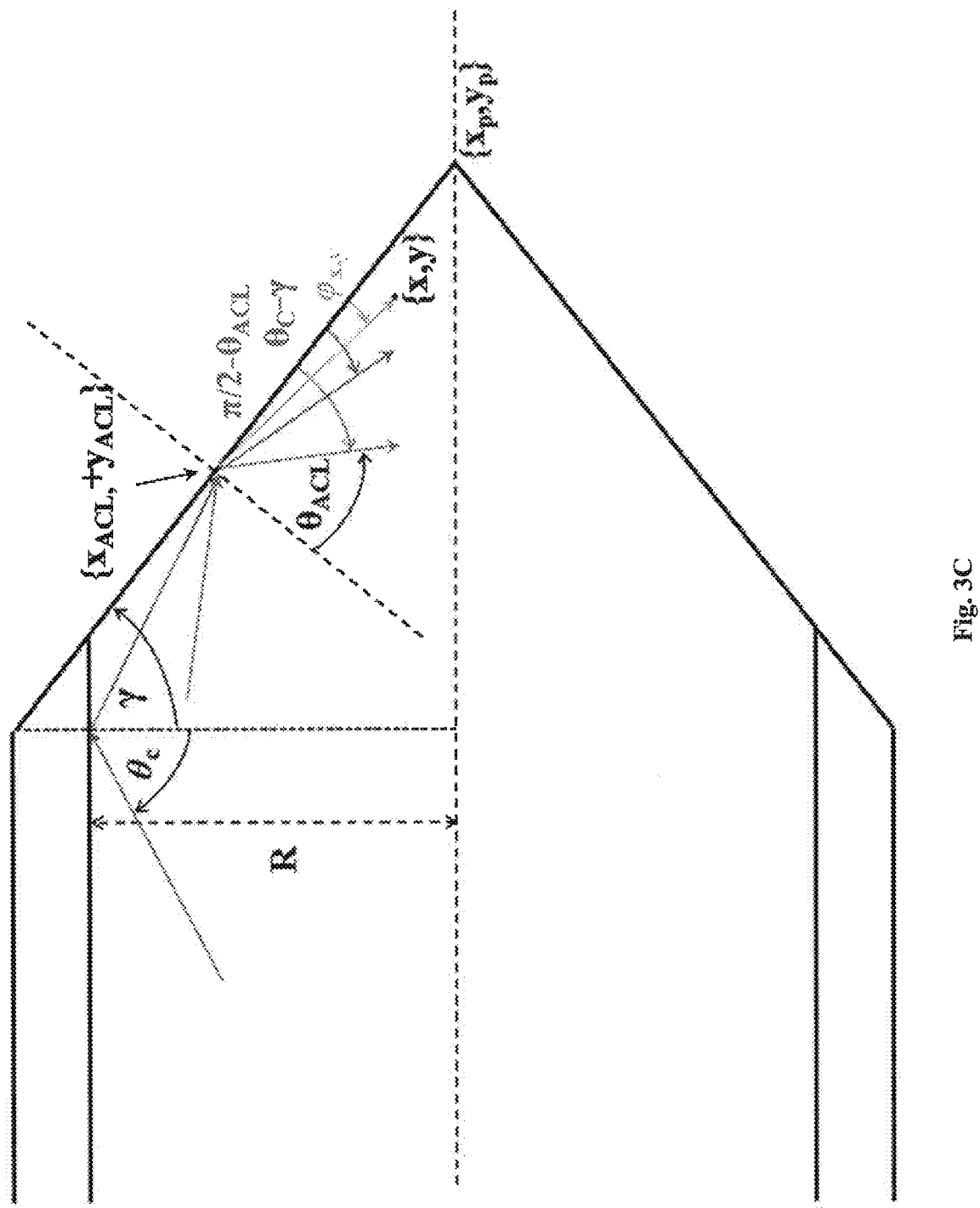
Figures 4A, 4B, 4C, 4D, 4E, 4F:
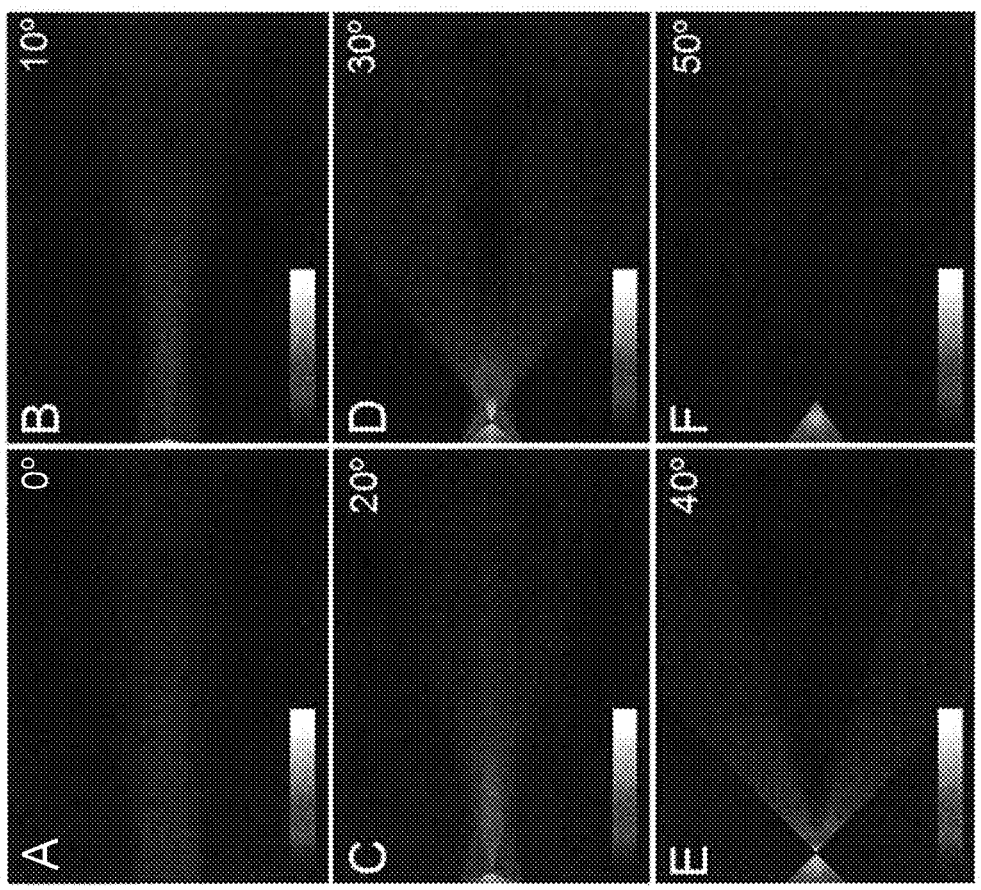
FIGS. 4A-4F show two-dimensional representations of the calculated intensity distribution inside and outside axicon lenses with different cone angles, wherein angles in the range of about 10-40 degrees produce a bright focal region in front of the axicon lens, and at larger cone angles the light is predominantly reflected inside the cone and only then leaves the cone (the rays are not shown in the figures).

In this approach the intensity of each pixel {x,y} was calculated by adding light rays that emanate from the two finely incremented lines that form the profile of the axicon lens (FIGS. 3A-3C).

For light that is focussed outside the axicon lens in a medium with refractive index $n_0$, the intensity at point {x,y} is incremented by one unit if the angle $\phi^u_{xy}$ falls between the two limiting angles $\beta_1$ and $\beta_2$. In addition, the intensity is incremented by one more unit if the angle $\phi^d_{xy}$ falls between $-\beta_1$ and $-\beta_2$. These angles are $\beta_1 = \phi_{s1} - \gamma$ and $\beta_2 = \phi_{s1} + \gamma$. From Snell's law $$\sin\phi_{s1,s2} = \frac{n_{core}}{n_0}\sin\phi_{f1,2} \qquad (1)$$

where $n_{core}$ and $n_0$ are the refractive indices of the fiber core and the surrounding medium, respectively. The two limiting incidence angles at the inner surface of the axicon lens are $\phi_{f1}=\pi/2-\theta_c+\gamma$ and $\phi_{f2}=\pi/2-\theta_c-\gamma$. The critical incidence angle inside the multimode fiber is governed by the refractive index of the cladding, $n_{clad}$:

$$\theta_c = \sin^{-1}\left(\frac{n_{clad}}{n_{core}}\right) \quad (2)$$

Given the refractive indices $n_0$, $n_{clad}$ and $n_{core}$, as well as the cone angle, $\gamma$, of the axicon lens it is straightforward to determine the range of angles, $\beta_1$ and $\beta_2$, that can be irradiated from each point on the surface of the axicon lens. These angles are then compared to the two angles defining the point in the sample space that is under consideration, i.e., $$\phi_{xy}^u = \tan^{-1}\left(\frac{y - y_{ACL}}{x - x_{ACL}}\right) \quad (3)$$
$$\phi_{xy}^d = \tan^{-1}\left(\frac{y + y_{ACL}}{x - x_{ACL}}\right)$$

Here, $0<y_{ACL}<R$ and $x_{ACL}=(R-y_{ACL})\tan(\gamma)$, with R being the radius of the core of the multimode fiber. When $\beta_1<\phi^u_{xy}<\beta_2$ the intensity is incremented due to irradiation from the upper half of the axicon lens and when $-\beta_1>\phi^d_{xy}>-\beta_2$ the intensity is incremented due to irradiation from the lower half.

A similar calculation was performed to model the intensity of the light inside the axicon lens (FIG. 3C). For large cone angles, $\gamma$, the guided light in the multimode fiber is likely to undergo total internal reflection on the inside of the axicon lens, thereby creating a region of increased light intensity below the tip of the lens. A point inside the axicon lens will be irradiated by reflected light only if the angle $\phi_{x,y}<\theta_c-\gamma$ and $\phi_{x,y}<\theta_{ACL}-\pi/2$. The critical angle for guided light in the fiber, $\theta_c$, is given by (2), whereas that for total internal reflection at the axicon surface is $$\theta_{ACL} = \sin^{-1}\left(\frac{n_0}{n_{core}}\right) \quad (4)$$

The angle $\phi_{xy}$ is more complicated to determine but can be concisely described as $$\phi_{xy} = \cos^{-1}\left(\frac{a+b-c}{\sqrt{4ab}}\right) \quad (5)$$
$$a = (x_{ACL} - x)^2 + (y_{ACL} - y)^2$$
$$b = (x_{ACL} - x_p)^2 + (y_{ACL} - y_p)^2$$
$$c = (x_p - x)^2 + (y_p - y)^2,$$

where the coordinates of the axicon tip are $x_p=R \sin \gamma$ and $y_p=0$. The intensity at $\{x,y\}$ is then calculated as above, i.e., by incrementing $y_{ACL}$ between 0 and R and determining $x_{ACL}=(R-y_{ACL})\tan(\gamma)$ as well as all three angles $\phi_{xy}$, $\theta_c$ and $\theta_{ACL}$ as described above. The intensity is incremented by one unit, if $\phi_{xy}$ is smaller than both angles $\theta_c$ and $\theta_{ACL}$.

Example results are shown in FIGS. 4A-4F for axicon lenses with cone angles between 0 and 50 degrees. Note that these are 2-dimensional calculations and an image representing the intensity distribution as seen by an observer requires an Abel transformation as mentioned above.

3. Results and Discussion

Microaxicon Lens Fabrication via Wet-Chemical Etching

Figures 5A, 5B, 5C, 5D, 5E, 5F:
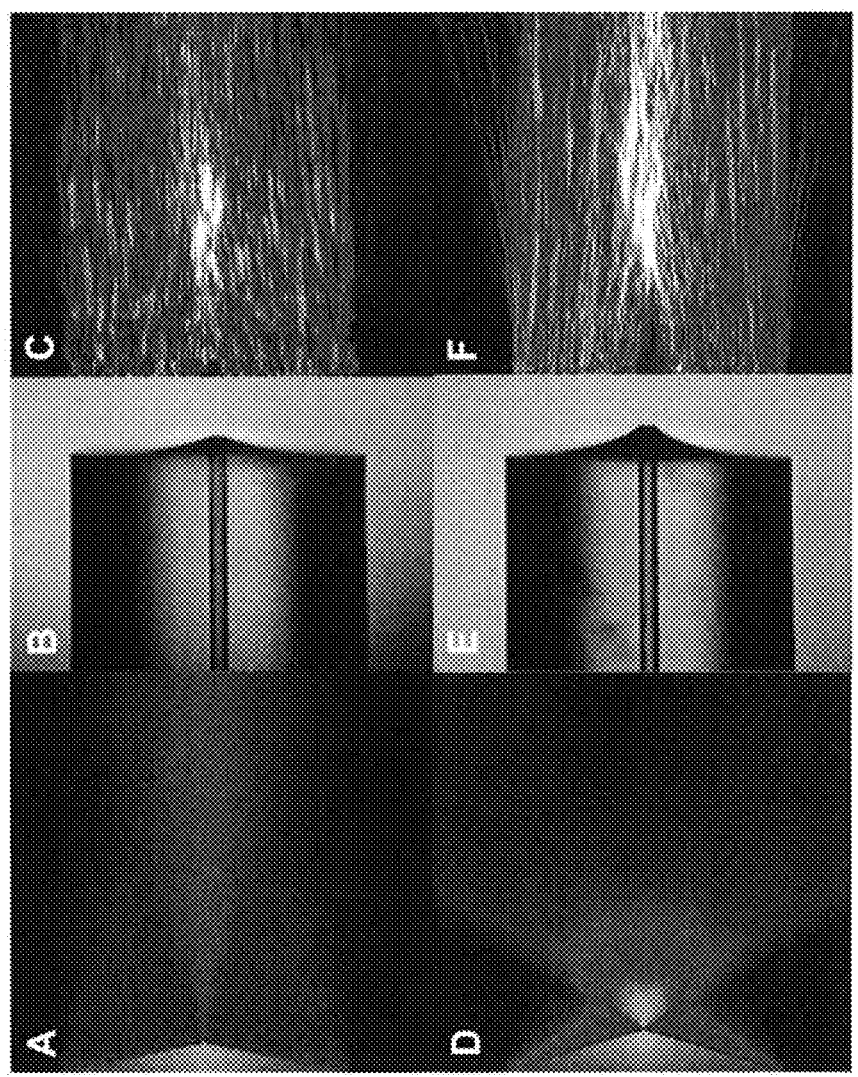
FIG. 5A shows a modelled emission pattern for a 15° axicon lens; 5B is an optical micrograph of a 15° axicon lens in front of a Ø320 µm capillary; 5C shows an experimental emission pattern of the 15° axicon lens.
FIGS. 5D-5F are analogous images for a 35° axicon lens.

While fused-silica capillaries are primarily designed for fluidics applications and not designed to guide light, they offer structural and chemical properties similar to optical fibers. Without the presence of preventative water flow, wet-chemical etching of a glass capillary or "holey" microstructured fiber would proceed both, from the outer walls and etching inward as well as the etchant diffusing into the channel and etching outward. This results in the rapid expansion of the channel to form a much larger bore, and eventually in the destruction of the capillary walls. To control the etching process, water flow was introduced at a rate comparable to the diffusion rate of etchant into the channel, which ensured that the etching proceeds only from the outer walls of the capillary. The constant flow of water through the capillary (into the etchant solution) also dilutes the etchant. More importantly the water flow introduced an etchant concentration gradient extending radially from the center axis of the waveguide. A single tapered fused-silica cone, or "micronozzle", is then formed from the originally flat facet of the capillary (FIGS. 5B and 5E). This cone acts as a microaxicon lens.

The length of the protruding microaxicon lenses and their cone angle may be adjusted through the etch time, etchant concentration, and/or the flow rate of water during the etching procedure. For example, longer etch times or higher HF concentration results in longer micronozzle (i.e., microaxicon lens) protrusion. FIG. 5B shows a microaxicon lens with a cone angle of approximately 15° produced after etching for 10 min and FIG. 5E shows a microaxicon lens with an approximately 35° cone angle which is formed after 20 minutes of etching in HF solution. The water flow rate was kept constant. The shape of the microaxicon lens reflects presumably the concentration gradient of the HF solution.

Etching of the custom "holey" MSF results in several microaxicon lenses which were formed at the end of each of the nine channels. As opposed to the single capillaries, the MSF contains two different types of glass. As for the single capillary, the microaxicon is fabricated from fused silica, which in this case is embedded in borosilicate glass. The borosilicate glass is etched much faster by HF solution and, as it is removed, it exposed the sidewalls of the embedded fused-silica capillary. The process is readily modelled using simple rate equations.

The model provided herein describes the etching kinetics and the geometry of the final structure based on a few simple assumptions. It was assumed that the material removal rate depends linearly on the constant concentration of the etchant, [HF], and a rate constant, k, that is different for the borosilicate glass ($k_1$) and undoped silicate glass ($k_2$).

$$\frac{dx}{dt} = k_i[HF]_x \quad (6)$$

Figures 6A, 6B, 6C:
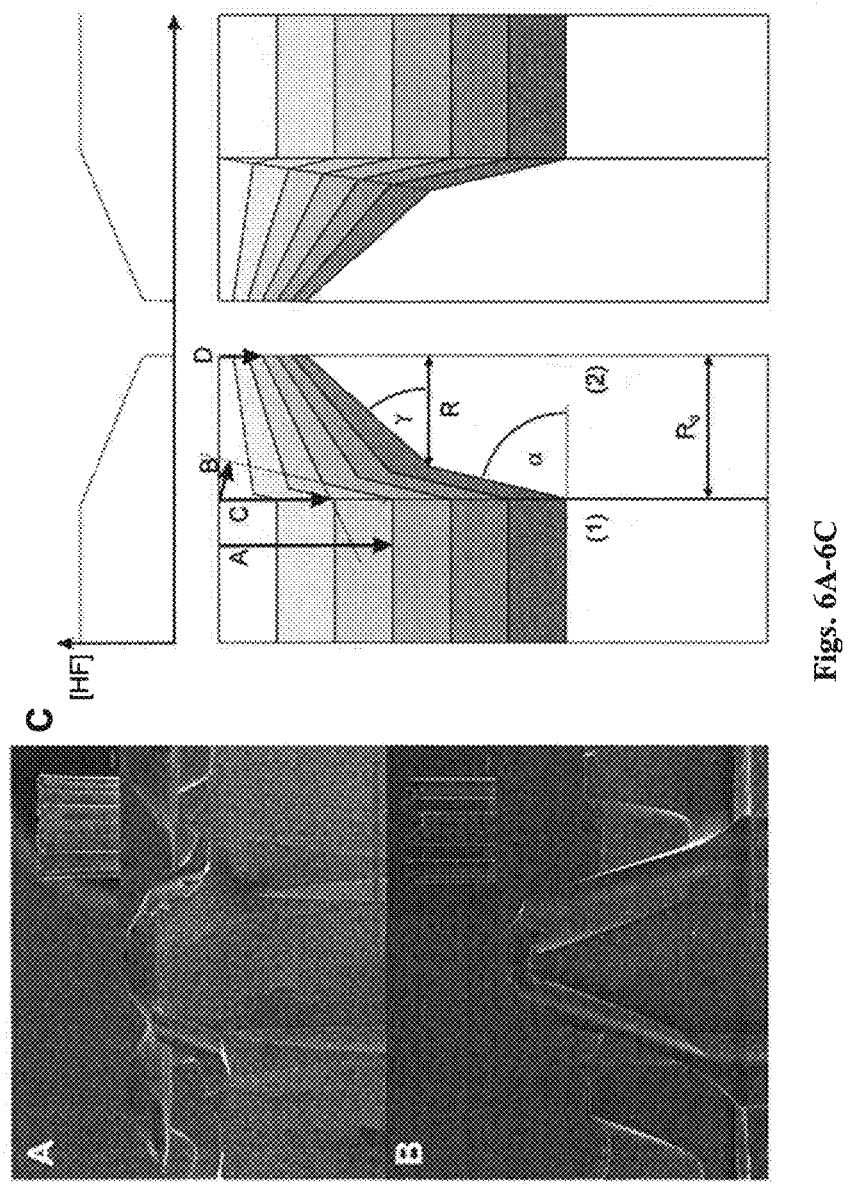
FIGS. 6A and 6B are scanning electron micrographs of microaxicon lenses produced by etching a custom microstructured fiber for (6A) 12 minutes and (6B) for 17 minutes with ~80 nL/min water flow through the centre holes; inset images show the entire fiber profile (all scale bars are 50 µm)
FIG. 6C is a schematic diagram of microaxicon lens formation as the etching procedure occurs, wherein (1) and (2) correspond to borosilicate and fused-silica compositions, respectively, and $R_0$ is the distance from the channel wall to the borosilicate boundary (i.e., the base width) and R is the width of the top portion of the microaxicon lens.

The HF concentration is furthermore assumed to vary linearly between the inner rim of the water filled capillary, $[HF]_D$, and the outer border of the silicate capillary, $[HF]_C$, (see the profile on top of FIG. 6C). The axicon angle is then determined as $$\gamma = \tan^{-1}\left(\frac{\Delta x_C - \Delta x_D}{R}\right) = \tan^{-1}\left(\frac{k_2 t}{R}([HF]_D - [HF]_C)\right) \quad (7)$$

where $\Delta x_{C,D} = k_2 t[HF]_{C,D}$ is by integration of (6). The axicon angle therefore increases as a function of etch time, as observed. The "post angle" $\alpha$ can similarly be obtained using the integral of (6)

$$\Delta x_B = k_2 [HF]_n (t - t_A) \qquad (8)$$

Since the sidewall is only etched after the borosilicate has been removed, the removal rate of the borosilicate glass must be considered, since this will determine the lower integration limit. This consideration yields $$t_A = \frac{\Delta x_A}{k_1 [HF]_A} \qquad (9)$$

and insertion into (8) gives:

$$\Delta x_B = k_2 [HF]_B t - \frac{k_2 [HF]_B}{k_1 [HF]_A} \Delta x_A. \qquad (10)$$

Setting $[HF]_A = [HF]_B$ for simplicity, the line describing the post wall at any time, $\tau$, is therefore:

$$x_A = k_1 [HF]_B \tau - \frac{k_1}{k_2} x_B \qquad (11)$$

and the post angle is given by the angle between $x_A$ and $x_B$ $$\alpha = \cos^{-1}\left(\frac{k_1}{k_2}\right) \qquad (12)$$

It is expected to be largely independent of etching time. The radius of the axicon lenses, $$R = R_0 - \Delta x_B \cos(\alpha) \qquad (13)$$

may be calculated using Eqs. (8), (9), and (12) to give $$R = R_0 - k_1 [HF]_B t + \Delta x_A \qquad (14)$$

In the SEM micrographs of FIGS. 6A and 6B the two cone angles are clearly discernable. The axicon angle $\gamma$ is dependent on the concentration gradient and increases with time according to Eq. (7). It changes from 30° to 36° degrees as the etching time is increased from 10 to 20 minutes. The post angle $\alpha$ only depends on the ratio of the etch rate constants of borosilicate glass and fused silica according to Eq. (12). As expected, it remains approximately constant between 10 minutes etch time (72°) and 20 minutes (70°) (FIGS. 6A and 6B).

Optical Characteristics of Microaxicon Lenses
Microaxicon Lenses on Capillaries

The ability of microaxicon lenses to focus light was evaluated by following the protocol explained above images were captured at 5 μm intervals from the base of the microaxicon lens extending to 400 μm from the tip of the axicon. These images were processed to give a 2D intensity cross section containing the capillary axis. Two examples are displayed in FIGS. 5C and 5F. The tight but elongated focal regions extending from the tip of the axicon lenses confirm that the etched capillaries indeed produce Bessel-type beams. The longer etch time leads to a larger axicon angle and consequently to a tighter focus near the tip of the microaxicon. These experimental data show a 2D cross section of the focusing characteristics, similar to the result of the calculation shown in FIGS. 5A and 5D. Yet, there are differences between these figures. By design the experimental microscope images show light in the focal plane of the microscope but also a blurred background of unfocussed light. FIGS. 5C and 5F therefore show a constant presence of light over the entire travel distance which diverges (visible especially in FIG. 5F) due to blurring, but not to beam divergence. Nevertheless, the experimental images confirm that for the 35° cone angle $\alpha$ focal region was observed near the top of the cone at about 170 μm, which agrees very well with the theoretical prediction. At a cone angle of 15° the focal region is found to be 290 μm, whereas the simulation predicts it to be at about 240 μm. The agreement is better than what might be expected, especially considering that the shape of the tip is not an ideal cone (FIGS. 5B and 5E).

The center hole in the capillaries is expected to have only a small effect on the optical properties of the fiber microaxicon lenses. The hole diameter is only 10 μm whereas the capillary diameter is 320 μm. Given that the ratio of the cross sectional areas is about 1:1000, contributions of rays exiting the hole were not observed.

3.1.1. MSF Microaxixon Lenses

Figures 7A, 7B:
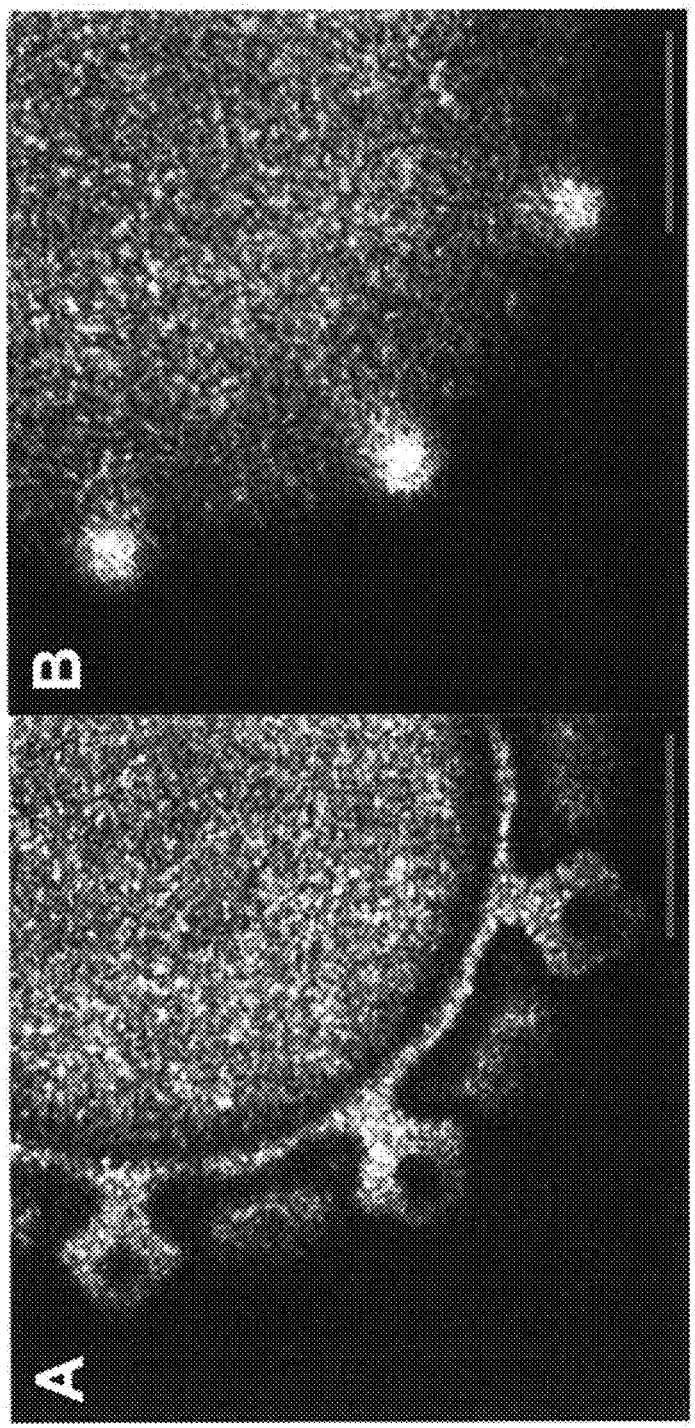
FIGS. 7A and 7B are optical micrographs of microaxicon lens tips in focus and from ~40 µm away from microaxicon lens tip, respectively, showing the focal point of a shallow etched MSF, wherein the images show three of the nine microaxicon lenses on the facet of the MSF of FIG. 6A (scale bars are 50 µm in both images).

The fused silica portion of the microstructured waveguide has a higher refractive index of $n_{core} = 1.464$ at 655 nm compared to the borosilicate glass ($n_{clad} = 1.461$). The silica portions of the MSF therefore behave like cladded multi-mode fiber waveguides. The microaxicon lenses on the MSF are then expected to have similar focusing characteristics compared to the microaxicon lenses formed on the fused silica capillaries. It was found that the MSF showed good light guiding properties within the silica regions of the fiber. Similar to the capillary-microlenses, the focusing behavior of two fibers each having nine microaxicon lenses with nearly identical etch profiles were characterized to validate the formation of axicon lenses. Again, the focusing properties of the microlenses were obtained following the protocol outlined above. It was observed that each of the nine microaxicon lenses at the facets of the two fibers had a tight focal point with very little extension in the transverse plane. It was also found that the focal points are strongly dependent on the etch profile, i.e., on the HF concentration and submersion duration. The focal points were found by immobilizing the fiber and coupling light into the free end of the fiber while the microscope objective was translated away from the microaxicon lenses. The region of the smallest and brightest spots was identified in five replicate experiments for two different MSF microaxicon lens profiles (shown in FIGS. 6A and 6B). By averaging the nine focal points in each fiber and the five trials, focal lengths of 40.8±1.6 μm were obtained for the shallow-angle microaxicon lenses in FIG. 6A and 15.6±1.1 μm for the larger axicon angles of FIG. 6B. FIGS. 7A and 7B show an example of how the focal length was determined using laser-coupled optical microscopy.

4. Axicon Lenses as Injector Nozzles for Mass Spectrometry

Axicon lenses produced as described above are useful as injector nozzles (also referred to herein as "micronozzles") for mass spectrometry and in multiple particle trapping.

Electrospray ionization is a method used to generate gas phase ions for a range of applications. In particular it is used to generate ions of large molecules in "soft manner" as to not cause significant molecular fragmentation. It is currently a preferred method for the analysis of bio-molecular species in solution at very low concentration (e.g., proteomics, metabolomics, etc.). Sensitivity of the method is based upon the efficiency of the ion formation process. In the past, a heated sheath flow was used to increase the temperature of the electrospray and enhance desolvation of the dissolved ions. Reduced flow also increases the efficiency of the ion formation process. This may allow more of the sample to be used. A microstructured fibre may be used to fabricate a radial array of axicon lenses (that are each singly perforated with a capillary), which may then be used to flow liquid directly through the axicon lenses while it is also conducting and focusing light. This type of configuration has the following benefits:

The illuminated region (i.e., Taylor cone) is effectively self-positioning and focusing.

The radiation that interacts with the sample can be quickly turned on an off.

There is a possibility of photochemical reactions (e.g., electro-spinning of polymer fibers)

The radiation may be used to photochemically or thermally clean the axicon lenses.

They may be combined with multi-nanoelectrospray emitters.

Desolvation may be carefully controlled at the exact point where the ions are generated.

Apparatus

Referring to FIG. 8, a MSF 82 with two or more axicon lenses 82a, 82b, etc. at its facet is placed in a four way junction 80. In one port of the junction the axicon lens containing MSF is inserted. In the port directly opposite to the MSF a fiber optic cable 84 is inserted, or, in another embodiment (e.g., free space optics), a window is provided to allow light to be coupled into the MSF. In a third port (e.g., orthogonal to the MSF) an electrode 86 (e.g., platinum wire) is inserted to enable a voltage to be applied to the liquid sample supplied by a capillary 88 inserted into the fourth port, which may be orthogonal to the MSF and fiber optic cable.

Liquid (e.g., a sample) is flowed through the capillary 88 and once entering the port 80 is directed to the MSF 82 (axicon lens containing fiber) where the flow is split between the multiple capillaries of the MSF such that each axicon lens 82a, 82b, etc. produces an electrospray. Operation is shown schematically in FIG. 9. For simplicity, operation is shown for a single axicon lens 82a. At the tip of axicon lens 82a a Taylor cone 92a and electrospray 96 forms in the vicinity of the mass spectrometer orifice 98, due to the applied electric field (electrode). Light (e.g., infrared radiation, but not limited thereto) is directed into the fiber or through the window (e.g., in a free space optics embodiment) where it traverses the junction and enters the MSF. As shown in the magnified view of FIG. 9, the doped region surrounding the fiber conducts the light to the axicon lense 82a that focuses the light into the Taylor cone 92a and/or a region 94a in proximity to the Taylor cone. The intensity and wavelength of the light may be changed to alter desolvation energy, promote chemical reactivity, and/or clean the axicon lens array.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A method for fabricating an axicon lens on a capillary of an electrospray emitter, comprising:
   providing a capillary having a channel, an inner layer, and an outer layer;
   wherein the inner and outer layers comprise different silica materials;
   flowing liquid through the capillary channel from a first end to a second end at a selected flow rate;
   etching the second end of the capillary by submersing the second end substantially perpendicularly in a solution comprising at least one etching reagent at a selected concentration;
   wherein liquid flowing out of the second end of the capillary channel creates a concentration gradient of the at least one etching reagent;
   removing the capillary from the etching reagent solution after an etching time so that a selected axicon lens geometry is achieved;
   wherein the selected axicon lens geometry comprises the inner layer having:
   i) an axicon angle γ determined by the concentration gradient, and
   ii) a post angle α determined by a ratio of etch rate constants of the different silica materials in the solution comprising at least one etching reagent;
   wherein the selected axicon lens geometry focuses light guided by the capillary channel in a region of a Taylor cone produced by the electrospray emitter simultaneously while generating an electrospray;
   wherein the simultaneous focussing of light guided by the capillary channel enhances ionization efficiency of the electrospray.

2. The method of claim 1, wherein the inner layer comprises fused silica and the outer layer comprises borosilicate glass.

3. The method of claim 2, wherein the post angle α is determined by a ratio of an etch rate constant of the borosilicate glass and an etch rate constant of the fused silica in the solution comprising at least one etching reagent.

4. The method of claim 1, wherein the capillary comprises a microstructured fibre (MSF).

5. An electrospray emitter, comprising:
   a capillary having a capillary channel, an inner layer, and an outer layer;
   wherein the inner and outer layers comprise different silica materials;
   an axicon lens formed on a facet end of the capillary channel;
   wherein the axicon lens has a selected geometry comprising the inner layer having an axicon angle γ and a post angle α;
   wherein the selected axicon lens geometry focuses light guided by the capillary channel in a region of a Taylor cone produced by the electrospray emitter simultaneously while generating an electrospray;
   wherein the simultaneous focussing of light guided by the capillary channel enhances ionization efficiency of the electrospray.

6. The electrospray emitter of claim 5, wherein the inner layer comprises fused silica and the outer layer comprises borosilicate glass.

7. The electrospray emitter of claim 6, wherein the post angle α is determined in part by an etch rate constant of the borosilicate glass and an etch rate constant of the fused silica in at least one etching reagent.

8. The electrospray emitter of claim 5, wherein the capillary is a MSF comprising at least two capillary channels, and an axicon lens formed on a facet end of each of the at least two capillary channels.

9. The electrospray emitter of claim 5, for use with a mass spectrometer.

10. A method for generating an electrospray, comprising configuring the electrospray emitter of claim 5 for use with light simultaneously while generating the electrospray, wherein the selected axicon lens geometry focuses the light substantially in a region of a Taylor cone produced by the electrospray emitter.

11. The method of claim 4, wherein the MSF comprises two or more channels;
- wherein each channel of the two or more channels comprises the inner layer and the outer layer;
- wherein the selected axicon lens geometry is achieved for each channel of the two or more channels.

* * * * *